United States Patent
Clerc et al.

(10) Patent No.: US 6,630,962 B2
(45) Date of Patent: Oct. 7, 2003

(54) PROCESS AND DEVICE FOR FIELD OR FRAME FREQUENCY CONVERSION UTILIZING A DYNAMIC CALCULATION OF THE INTERPOLATION PHASES

(75) Inventors: François Le Clerc, Rennes (FR); Jean-Yves Babonneau, L'Hermitage (FR)

(73) Assignee: Thomson Licensing S.A., Boulogne Cedex (FR)

( * ) Notice: Subject to any disclaimer, the term of this patent is extended or adjusted under 35 U.S.C. 154(b) by 484 days.

(21) Appl. No.: 09/739,148

(22) Filed: Dec. 18, 2000

(65) Prior Publication Data

US 2001/0038421 A1 Nov. 8, 2001

(30) Foreign Application Priority Data

Dec. 20, 1999 (FR) .............................. 99 16053

(51) Int. Cl.⁷ ........................... H04N 11/20; H04N 7/01
(52) U.S. Cl. ...................... 348/459; 348/441; 348/536
(58) Field of Search .................. 348/536, 537, 348/538, 497, 498, 441, 459, 448; H04N 11/20, 11/22, 7/01

(56) References Cited

U.S. PATENT DOCUMENTS

| | | | | |
|---|---|---|---|---|
| 5,651,031 A | * | 7/1997 | Ishizu | ..................... 375/328 |
| 6,288,745 B1 | * | 9/2001 | Okuno et al. | ............... 348/448 |
| 6,331,862 B1 | * | 12/2001 | Yamada et al. | ............. 348/459 |
| 6,407,775 B1 | * | 6/2002 | Frink et al. | ................ 348/443 |
| 6,480,232 B1 | * | 11/2002 | Wilson et al. | ............... 348/459 |

FOREIGN PATENT DOCUMENTS

EP 0323198 A2 7/1989 ........... H04N/7/01

OTHER PUBLICATIONS

EPO Search Report dated: Sep. 13, 2000.

* cited by examiner

Primary Examiner—John Miller
Assistant Examiner—Trang U. Tran
(74) Attorney, Agent, or Firm—Joseph S Tripoli; Ronald H Kurdyla; Vincent E Duffy

(57) ABSTRACT

The process is characterized in that it stores a position of the write pointer $P_W$ on receipt of the synchronization signal S1 relating to the input signal so as to provide a value $P_{W-IN}$, and on receipt of the synchronization signal S2 relating to the output signal so as to provide a value $P_{W-OUT}$, in that it dynamically calculates an interpolation phase $\alpha$ (12, 13, 14, 15) such that:

$$\alpha = \frac{P_{W\_OUT} - P_{W\_IN}}{\Delta P_{W\_FIELD}} \text{ if } P_{W\_OUT} \geq P_{W\_IN}$$

or $$\alpha = \frac{P_{W\_OUT} + N_{CAP} \cdot \Delta P_{W\_FIELD} - P_{W\_IN}}{\Delta P_{W\_FIELD}} \text{ if } P_{W\_OUT} < P_{W\_IN}$$

$\Delta P_{W\_FIELD}$ being the memory quantity required for the storage of a field or frame of the input signal and $N_{CAP}$ the capacity of the memory (8) expressed in terms of number of fields or frames, and in that it performs a phase interpolation (20) corresponding to this value.

5 Claims, 3 Drawing Sheets

PROCESS AND DEVICE FOR FIELD OR FRAME FREQUENCY CONVERSION UTILIZING A DYNAMIC CALCULATION OF THE INTERPOLATION PHASES

FIELD OF THE INVENTION

The invention relates to a process and device for the frequency conversion of video signals, utilizing a dynamic calculation of the interpolation phases.

BACKGROUND OF THE INVENTION

Known frequency conversion devices are utilized, among other things, for standards conversion, for example the conversion of a PAL or SECAM 50 Hz signal into an NTSC 60 Hz signal. They are also utilized to increase the scanning frequency of television receivers, typically from 50 Hz to 100 Hz, for the purpose of improving the quality of the picture, by reducing the large area flicker.

In the general case, the frequency of the signal to be converted and the frequency of the converted signal are known in advance. The interpolation process consists in creating intermediate fields between two reference fields of the input signal to be converted. This process is shown diagrammatically in FIG. 1.

The fields referenced 1 and 2 correspond respectively to the previous reference field of the input video sequence and to the next reference field of this sequence.

The field referenced 3 is the intermediate field to be created. This field is located temporally between the previous field and the next field, at an instant defined by a value $\alpha$ corresponding to the interpolation phase.

If $t_{prev}$ and $t_{next}$ correspond to the instants relating to the previous field and to the next field, the instant $t_{interp}$ relating to the intermediate field to be interpolated is then:

$$T_{interp} = t_{prev} + \alpha(t_{next} - t_{prev})$$
$$= t_{next} - (1 - \alpha)(t_{next} - t_{prev})$$

In a known manner, the interpolation processing can call upon linear filtering utilizing spatio-temporal filters with finite impulse response, or upon motion-compensated interpolation.

The processing methods utilized require knowledge of the interpolation phase for each field to be interpolated.

In the case where the input or output signal is not bound to a standard defining its frequency, a conversion device specific to these signals and in particular to their scanning frequency characteristic must be designed. This specificity naturally generates high costs. Moreover, modification of the scanning characteristics of a signal renders such a device unutilizable or, at the least, requires either manual intervention to render it compatible with the modified signal or signals, or the presence of circuits specific to these new characteristics.

The aim of the invention is to alleviate the aforesaid drawbacks.

SUMMARY OF THE INVENTION

To this end, the invention relates to a process for the field or frame frequency conversion utilizing a dynamic calculation of the interpolation phases, of an input video signal at a frequency F1 defined by a synchronization signal S1 into an output video signal at a variable frequency F2 defined by a synchronization signal S2, comprising a writing of the input signal to a memory on the basis of a write pointer $P_{W-IN}$, and a reading, from the memory, to obtain the output signal, characterized in that it stores the position of the write pointer $P_W$ on receipt of the synchronization signal S1 so as to provide a value $P_{W-IN}$, and on receipt of the synchronization signal S2 so as to provide a value $P_{W\_OUT}$, in that it dynamically calculates an interpolation phase $\alpha$ such that:

$$\alpha = \frac{P_{W\_OUT} - P_{W\_IN}}{\Delta P_{W\_FIELD}} \text{ if } P_{W\_OUT} \geq P_{W\_IN}$$

or $$\alpha = \frac{P_{W\_OUT} + N_{CAP} \cdot \Delta P_{W\_FIELD} - P_{W\_IN}}{\Delta P_{W\_FIELD}} \text{ if } P_{W\_OUT} < P_{W\_IN}$$

$\Delta P_{W\_FIELD}$ being the memory quantity required for the storage of a field or frame of the input signal and $N_{CAP}$ the capacity of the memory expressed in terms of number of fields or frames, and in that it performs a phase interpolation corresponding to this value.

According to a particular characteristic, three or four successive fields or frames are simultaneously stored in a memory and the interpolation is performed on the fields or frames preceding that being stored upon receipt of the signal S2 utilized for the calculation of the interpolation phase, on the basis of this calculated interpolation phase.

According to another characteristic, the calculation of the interpolation phase takes into account a shift of the write pointer corresponding to the duration of the field or frame blanking signal before the active video.

The invention also relates to a dynamic frequency conversion device for converting an input signal at a frequency F1 defined by a synchronization signal S1 into an output signal at a variable frequency F2 defined by the receipt of a synchronization signal S2, comprising a memory for writing the input signal on the basis of a write pointer $P_W$, an interpolation circuit receiving the outputs from the memory for read-access to a preceding field or frame T1 and read-access to a next field or frame T2, characterized in that it also comprises:

a circuit for storing the pointer $P_W$ on receipt of the signal S1 so as to provide a value $P_{W\_IN}$,
a circuit for storing the pointer $P_W$ on receipt of the signal S2 so as to provide a value $P_{W\_OUT}$,
a circuit for calculating interpolation phase $$\alpha = \frac{P_{W\_OUT} - P_{W\_IN}}{\Delta P_{W\_FIELD}} \text{ if } P_{W\_OUT} \geq P_{W\_IN}$$

or $$\alpha = \frac{P_{W\_OUT} + N_{CAP} \cdot \Delta P_{W\_FIELD} - P_{W\_IN}}{\Delta P_{W\_FIELD}} \text{ if } P_{W\_OUT} < P_{W\_IN}$$

$\Delta P_{W\_FIELD}$ being the memory quantity required for the storage of a field or frame of the input signal and $N_{CAP}$ the capacity of the memory expressed in terms of number of fields or frames, and in that the interpolation circuit is coupled to the calculating circuit so as to receive this interpolation phase and calculate the interpolated field or frame as a function of the interpolation phase.

By virtue of the invention, the process automatically calculates the interpolation phase corresponding to the output signal to be generated, when the scanning frequency of this output signal is not known a priori.

The device obtained is compatible with any type of output signal, at least in a wide frequency range. The device is simple to implement and cheap. It makes it possible to supply adjustable scanning frequency apparatuses, such as monitors of PC-type personal computers.

BRIEF DESCRIPTION OF THE DRAWINGS

The characteristics and advantages of the present invention will be more apparent from the following description given by way of example and with reference to the appended figures in which.

DETAILED DESCRIPTION

Figure 2:
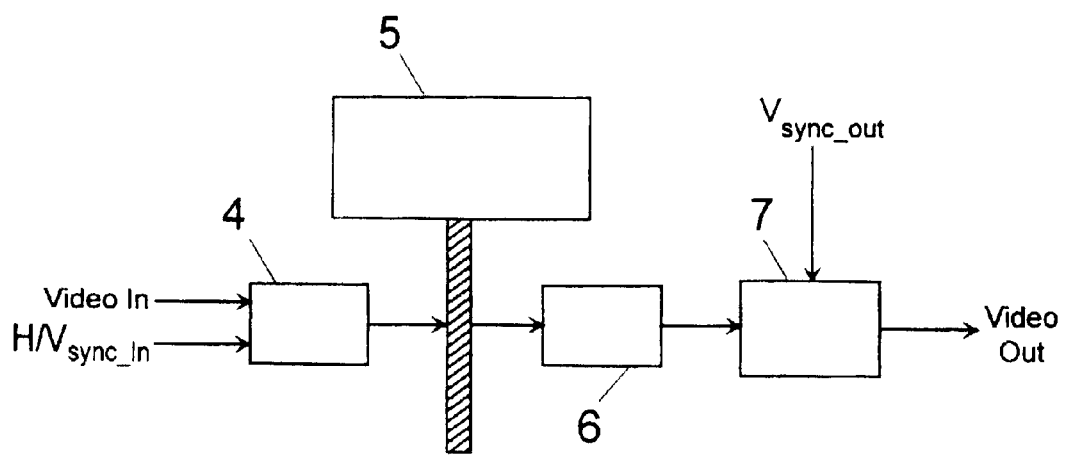
FIG. 2 represents diagrammatically a frequency conversion device

The device for field frequency conversion, implementing the process, is represented diagrammatically in FIG. 2.

An input video signal Video In is transmitted to a memory interface circuit 4. Together with this signal is transmitted a horizontal and vertical synchronization signal H/V$_{SYNC\ IN}$; a pulse indicates the start of a new line (horizontal synchronization) or of a new field (vertical synchronization).

The video information transported by the video signal relates to each pixel, a video line consisting of a succession of pixels and a field of a succession of lines. A RAM dynamic video memory 5 stores at successive addresses the digital data travelling through the memory interface 4. The memory capacity is such that at least two consecutive fields can be stored. These two fields are the reference fields previously referred to as the previous field and the next field.

The output video signal Video Out is synchronous with the synchronization signal V$_{SYNC\_OUT}$ originating from the apparatus supplied by the conversion device and corresponding to the desired scanning frequency. The video data stored in the RAM 5 are transmitted, via a memory interface 6, to an interpolation circuit 7.

This interpolation circuit 7 therefore receives the signal V$_{SYNC\_OUT}$ on the basis of which it calculates the interpolated frames. Given that the ratio of the frequencies of the input signal and of the output signal is not known a priori, the interpolation phases are calculated dynamically. The interpolation circuit therefore operates in an asynchronous manner with respect to the input signal and is controlled by the synchronization signal V$_{SYNC\_OUT}$ originating from the apparatus supplied with the output video signal, for example originating from a graphics card of a PC-type computer monitor in the case of a TV→PC converter.

Figure 3:
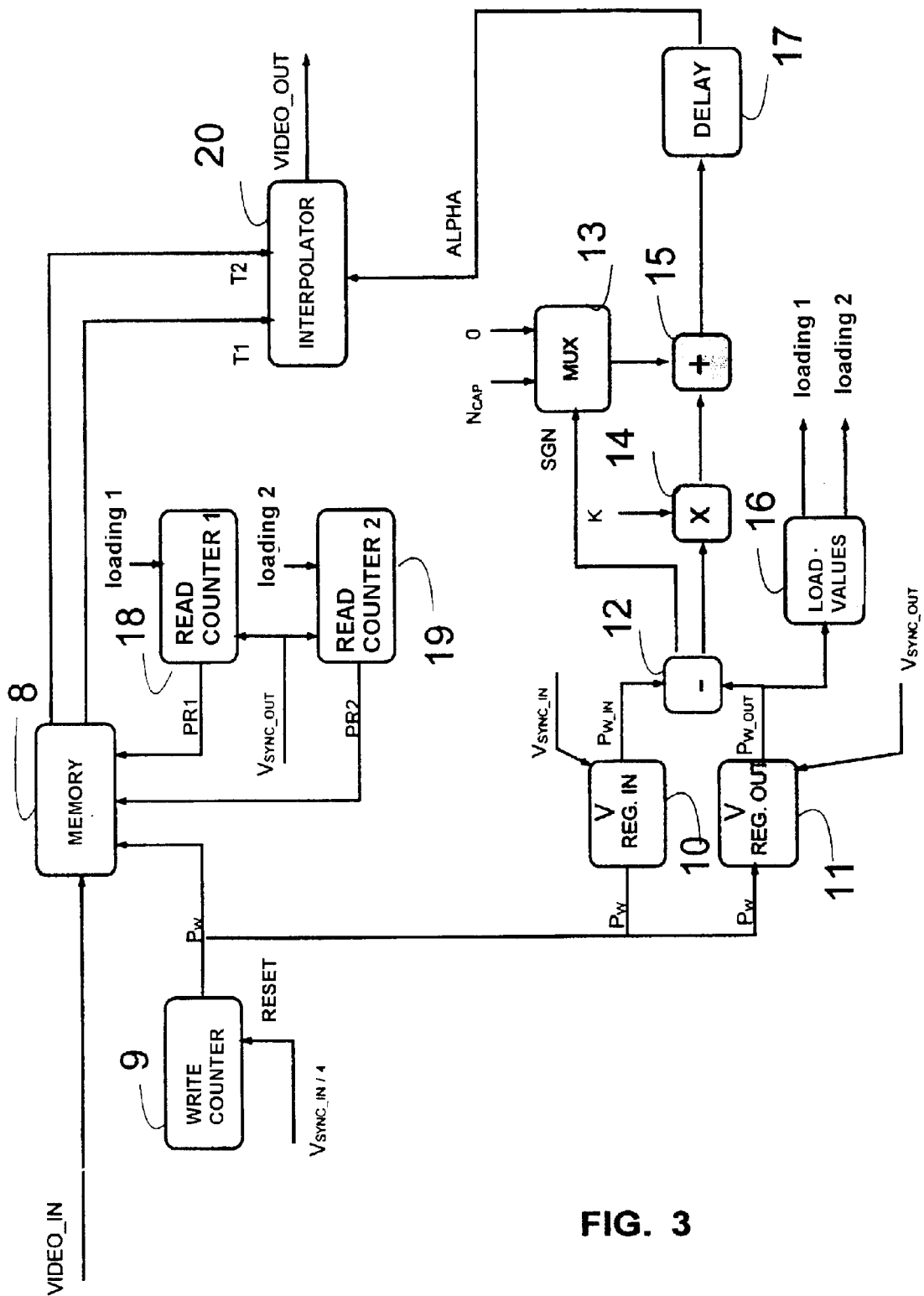
FIG. 3 represents in detail a frequency conversion device

FIG. 3 represents in greater detail an example of a frequency conversion device.

The video information input to the device is stored in the memory 8. This memory has a capacity of 4 fields and by virtue of dual read access, makes it possible to access 2 complete consecutive fields so as to carry out the interpolation. This makes it possible to avoid the problems of synchronization, the field read from a memory then being the last field stored in full in this memory. This is one example and the memory capacity can of course be lower, for example 3 fields, or less if one begins reading a field before it has been stored in full, this then requiring precautions with regard to the management of the pointers.

The interpolation is carried out between the field T1 and the field immediately following it T2.

A vertical synchronization signal V$_{SYNC\_IN}$ hereinafter referred to as S1, is available at each input field. One pulse out of every four pulses is transmitted to the reset input (reset) of a write address counter 9, this being the signal V$_{SYNC\_IN/4}$. The output of this counter is linked to the address inputs of the memory 8. It is also transmitted to the inputs of a register REG.IN 10 and of a register REG.OUT 11.

The register REG.IN stores the value of the write pointer, that is to say the address P$_{W\_IN}$ present on the address bus, on receipt of the input vertical synchronization signal V$_{SYNC\_IN}$ transmitted on the clock input of the register.

The register REG.OUT stores the value of the write pointer, that is to say the address P$_{W\_OUT}$ present on the address bus, on receipt of the output vertical synchronization signal V$_{SYNC\_OUT}$ transmitted on the clock input of the register. This signal V$_{SYNC\_OUT}$ is also referred to as S2.

A subtractor 12 receives the data P$_{W\_IN}$ and P$_{W\_OUT}$ provided by the registers 10 and 11. Its output (P$_{W\_OUT}$−P$_{W\_IN}$) is signed and transmitted, as signal SGN, to a control input of a multiplexer 13 as well as to an input of a multiplier 14. The multiplexer 13 receives a zero input and an input equal to the constant N$_{CAP}$ expressing, as number of fields, the capacity of the memory 8. This multiplexer is driven by the signal SGN, in such a way that its output is set to the value 0 if (P$_{W\_OUT}$−P$_{W\_IN}$)≧0 and to the value N$_{CAP}$ if (P$_{W\_OUT}$−P$_{W\_IN}$)<0. The output of the multiplier 14, which on another input receives a value K equal to 1/ΔP$_{W\_FIELD}$, is transmitted to the input of an adder 15. The second input of the adder originates from the output of the multiplexer 13. The value of the output signal from the adder 15, which corresponds to the expression K(P$_{W\_OUT}$−P$_{W\_IN}$) or else K(P$_{W\_OUT}$−P$_{W\_IN}$)+N$_{CAP}$ depending on the sign of the signal SGN, represents the value of α. This signal is transmitted, after passing through a delay circuit 17, to the interpolator 20.

The information P$_{W\_OUT}$ originating from the register REG.OUT 11 is also transmitted to a storage and calculating circuit 16. This circuit stores the last value of the pointer P$_{W\_OUT}$. It provides, on its two outputs, a first loading value "loading 1" and a second loading value "loading 2". These loading values are modified for each output field. They are one field out of phase.

The write pointer P$_W$ of the memory 8 is recorded upon receipt of a vertical synchronization pulse of the input signal (V$_{SYNC\_IN}$) and upon receipt of a vertical synchronization pulse of the output signal (V$_{SYNC\_OUT}$). The corresponding information P$_{W\_IN}$ and P$_{W\_OUT}$ respectively represent the start address of the current field recorded in the memory and the value of the pointer P$_W$ at the instant at which the synchronization pulse of the output signal is received, triggering the calculation of the new interpolated output field.

Let t$_{prev}$ and t$_{next}$ be the instants of receipt of the previous and next reference field which are used for the calculation of the interpolated field, that is to say the instants of receipt of the synchronization signals of these fields. Let t$_{interp}$ be the temporal position of the interpolated field.

Figure 1:
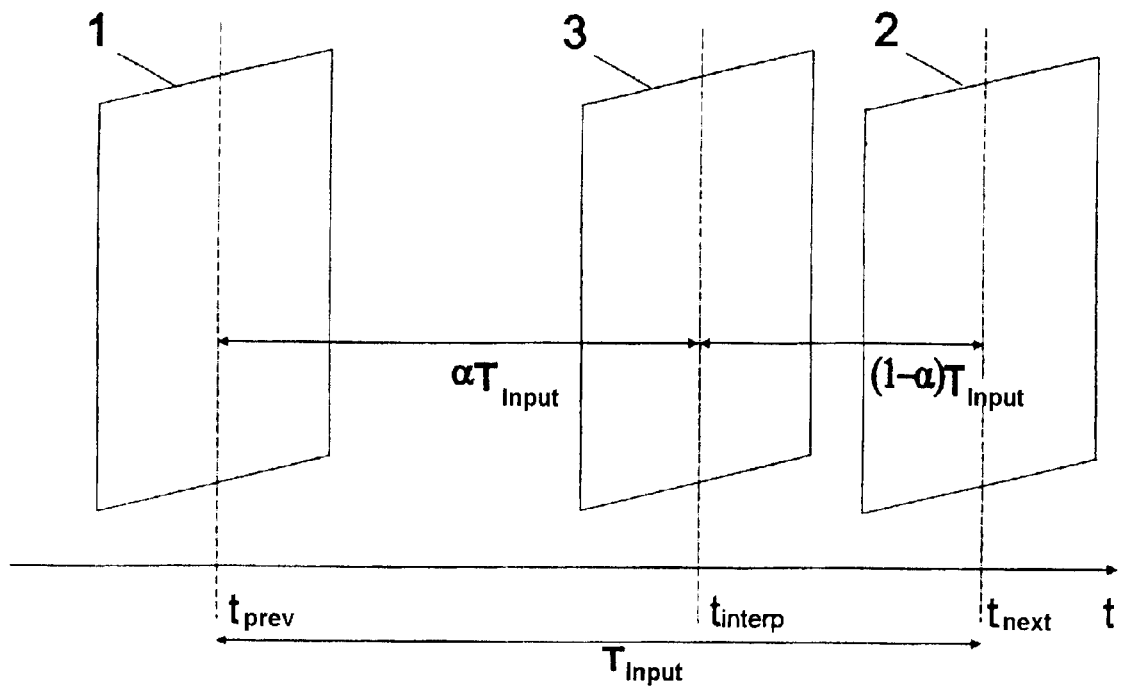
FIG. 1 represents a field interpolation

According to FIG. 1, we have:

$$\alpha = \frac{t_{interp} - t_{prev}}{t_{next} - t_{prev}}$$

If b is the bit rate of entry to the memory 8 of the words corresponding to the input video signal, in general the luminance signal, and if $\Delta P_{W\_FIELD}$ is the memory quantity required for the storage of an input field, we have, by the definition of $P_{W\_OUT}$ and $P_{W\_IN}$:

$$b(t_{interp} - t_{prev}) = P_{W\_OUT} - P_{W\_IN} \qquad 5$$

$$b(t_{next} - T_{prev}) = \Delta P_{W\_FIELD}$$

from which we deduce:

$$\alpha = \frac{P_{W\_OUT} - P_{W\_IN}}{\Delta P_{W\_FIELD}}$$

In practice, the capacity $N_{CAP} \cdot \Delta P_{W\_FIELD}$ of the memory 8 is finite and the input fields are written thereto cyclically. Thus, if their capacity is $N_{CAP}=4$ fields, after filling these memories starting from the address 0 with the first four fields received, the writing of the fifth field will commence at the address 0 and will therefore overwrite the content of the first field. In this configuration where $P_{W\_OUT}$ becomes less than $P_{W\_IN}$, the previous formula for calculating $\alpha$ should be modified as follows:

$$\alpha = \frac{P_{W\_OUT} + N_{CAP} \cdot \Delta P_{W\_FIELD} - P_{W\_IN}}{\Delta P_{W\_FIELD}}$$

$P_{W\_OUT} - P_{W\_IN}$ is calculated by the subtractor 12.

The correction to be made, if necessary, is carried out by the adder 15.

The constant K transmitted as input to the multiplier 14 is the value $$\frac{1}{\Delta P_{W\_FIELD}}$$

This value is known a priori.

The output from the adder 15 corresponds to the value $\alpha$ calculated at each arrival of the field synchronization signals. This coefficient $\alpha$ is delayed by the delay circuit 17 in such a way as to be able to be applied correctly to the set of fields T1 and T2.

The storage and calculating circuit 16 calculates the read addresses relating to the two accesses of the memory 8. On receipt of the synchronization signal $V_{SYNC\_OUT}$, the value $P_{W\_OUT}$ of the write pointer is stored. This value is used to calculate the start address for the reading of the fields T1 and T2 utilized for the interpolation. Given that four successive fields are stored in a memory, it is necessary to ascertain which one will be read and this depends on the position of the write pointer at the instant of receipt of the synchronization signal $V_{SYNC\_OUT}$.

If N is the number of addresses corresponding to a field and if the value of the pointer, upon receipt of the signal S2, lies between 0 and N, the loading value for the first field T1 to be read will be the address 2N and the loading value for the second field T2 to be read will be the address 3N, values corresponding to the last two complete fields loaded into the memory. If this value of the pointer lies between N and 2N, this signifies that the second field is being stored in the memory 8 and the loading value for the field T2 will then be the address 0. We therefore have:

$$\text{loading 1} = N \times \left( \text{integer part} \left[ \frac{P_{W\_OUT}}{N} \right] \right) + 2N \text{ (modulo } 4N\text{)}$$

The field T2 then corresponds to the value of "loading 2":

$$\text{loading 2} = N \times \left( \text{integer part} \left[ \frac{P_{W\_OUT}}{N} \right] \right) + 3N \text{ (modulo } 4N\text{)}$$

Two read counters 18 and 19 receive, on a loading input, respectively the outputs "loading 1" and "loading 2" originating from the storage and calculating circuit 16. The loading validation inputs of the counters are supplied with the synchronization signal $V_{SYNC\_OUT}$. The values "loading 1" and "loading 2" are stored on receipt of the synchronization signal $V_{SYNC\_OUT}$. The counters are initialized to these values and their outputs are linked to the memory 8 to trigger the reading of the video data of the fields T1 and T2 from the memory on the basis of the initialization values.

The video data read are transmitted to an interpolator 20 which carries out the calculation of the interpolated field, as a function of its temporal location defined by the value of $\alpha$, in relation to the reference source fields T1 and T2, according to a known process, for example using spatio-temporal linear filtering or motion-compensated interpolation.

The video data thus calculated are transmitted as output from the interpolator so as to constitute the output signal of the device.

The previous calculations assume a continuous stream of data of the input video signal. In fact, the signals include a field blanking interval (VBI standing for Vertical Blanking Interval) during which the field flyback occurs.

Figure 4:
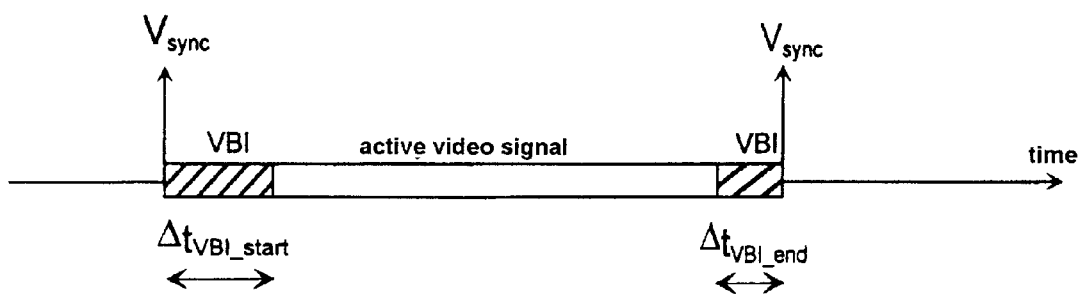
FIG. 4 represents field blanking intervals

Two solutions can then be implemented:
  either the video signal, corresponding to this time span VBI, is written to the video memory, so causing occupation of memory by unutilized signals. The value $P_{W\_OUT} - P_{W\_IN}$ then actually represents the time elapsed since the start of reception of the current field.
  or only the active part of the video signal is stored and it is then necessary to take into account the offset or shift generated by this signal VBI, in the manner described hereinbelow, with the aid of FIG. 4. A time axis is symbolized in this FIG. 4. $V_{SYNC}$ corresponds to the vertical synchronization signals. The video signal consists of a field blanking signal VBI (standing for Vertical Blanking Interval) preceding the active video, for a time $\Delta t_{VBI\_start}$ and of a VBI signal following the active video $\Delta t_{VBI\_end}$.

Let $\Delta P_{W\_VBI\_start}$ and $\Delta P_{W\_VBI\_end}$ be the offsets or shifts corresponding to the write pointer in the video memory.

$$\Delta P_{W\_VBI\_start} = b \Delta t_{VBI\_start}$$

$$\Delta P_{W\_VBI\_end} = b \Delta t_{VBI\_end}$$

The value of $\alpha$ then becomes:

$$\alpha = \frac{P_{W\_OUT} + \Delta P_{W\_VBI\_start} - P_{W\_IN}}{\Delta P_{W\_FIELD}}$$

if $P_{W\_OUT} + \Delta P_{W\_VBI\_start} \geq P_{W\_IN}$ or $$\alpha = \frac{P_{W\_OUT} + N_{CAP} \cdot \Delta P_{W\_FIELD} + \Delta P_{W\_VBI\_start} - P_{W\_IN}}{\Delta P_{W\_FIELD}}$$

if $P_{W\_OUT} + \Delta_{PW\_VBI\_start} < PW\_IN$

If the request for a new output field arrives during the VBI interval, $P_W$ not being updated during these intervals, it is then possible to round the value of $\alpha$ to 0 or to 1 depending on whether this request arrives during the VBI interval preceding or following the active video.

Concerning the line blanking signals (or horizontal blanking signals) corresponding to the line flyback, their duration is short enough to be neglected.

The above reasoning were conducted with regard to signals with interlaced type scanning, that is to say with regard to fields. Of course, the invention applies equally to frames if, for example, the input signal corresponds to a progressive type scanning. It is the successive frames which are then stored. Likewise, the output signal, which depends on the type of interpolation, can be of interlaced or progressive type without thereby departing from the domain of the invention.

What is claimed is:

1. Process for the frequency conversion utilizing a dynamic calculation of the interpolation phases, of an input video signal at a frequency F1 defined by a synchronization signal S1 into an output video signal at a variable frequency F2 defined by a synchronization signal S2, comprising a writing of the input signal to a memory on the basis of a write pointer $P_W$ and a reading, from the memory, to obtain the output signal, wherein it stores the position of the write pointer $P_W$ on receipt of the synchronization signal S1 so as to provide a value $P_{W\_IN}$, and on receipt of the synchronization signal S2 so as to provide a value $P_{W\_OUT}$, in that it dynamically calculates an interpolation phase $\alpha$ (12, 13, 14, 15) such that:

$$\alpha = \frac{P_{W\_OUT} - P_{W\_IN}}{\Delta P_{W\_FIELD}} \text{ if } P_{W\_OUT} \geq P_{W\_IN}$$

or $$\alpha = \frac{P_{W\_OUT} + N_{CAP} \cdot \Delta P_{W\_FIELD} - P_{W\_IN}}{\Delta P_{W\_FIELD}} \text{ if } P_{W\_OUT} < P_{W\_IN}$$

$\Delta P_{W\_FIELD}$ being the memory quantity required for the storage of a field or frame of the input signal and $N_{CAP}$ the capacity of the memory expressed in terms of number of fields or frames, and in that it performs a phase interpolation corresponding to this value.

2. Process according to claim 1, wherein three or four successive fields or frames are stored in the memory and in that the interpolation is performed on the fields or frames following that being stored upon receipt of the signal S2 utilized for the calculation of the interpolation phase, on the basis of this calculated interpolation phase.

3. Process according to claim 1, wherein the calculation of the interpolation phase takes into account a shift of the write pointer corresponding to the duration of the field or frame blanking signal before the active video.

4. Dynamic frequency conversion device for converting an input signal at a frequency F1 defined by a synchronization signal S1 into an output signal at a variable frequency F2 defined by the receipt of a synchronization signal S2, comprising a video memory for writing the input signal on the basis of a write pointer $P_W$, an interpolation circuit receiving the outputs from the memory for the reading of a field or frame T1 as first access followed by a next field or frame T2 as second access, wherein it also comprises:

a circuit for storing the pointer $P_W$ on receipt of the signal S1 so as to provide a value $P_{W\_IN}$, a circuit for storing the pointer $P_W$ on receipt of the signal S2 so as to provide a value $P_{W\_OUT}$, a circuit for calculating interpolation phase $$\alpha = \frac{P_{W\_OUT} - P_{W\_IN}}{\Delta P_{W\_FIELD}} \text{ if } P_{W\_OUT} \geq P_{W\_IN}$$

or $$\alpha = \frac{P_{W\_OUT} + N_{CAP} \cdot \Delta P_{W\_FIELD} - P_{W\_IN}}{\Delta P_{W\_FIELD}} \text{ if } P_{W\_OUT} < P_{W\_IN}$$

$\Delta P_{W\_FIELD}$ being the memory quantity required for the storage of a field or frame of the input signal and $N_{CAP}$ the capacity of the memory expressed in terms of number of fields or frames, and in that the interpolation circuit is coupled to the calculating circuit so as to receive this interpolation phase and calculate the interpolated field or frame as a function of the interpolation phase.

5. Device according to claim 4, wherein the calculating circuit consists of a subtractor, a multiplexer, a multiplier and an adder.

* * * * *